United States Patent
Akl et al.

(10) Patent No.: US 11,871,215 B2
(45) Date of Patent: Jan. 9, 2024

(54) UPLINK-CENTRIC HANDOVER IN A WIRELESS MULTI-HOP NETWORK

(71) Applicant: QUALCOMM Incorporated, San Diego, CA (US)

(72) Inventors: Naeem Akl, Somerville, NJ (US); Navid Abedini, Somerset, NJ (US); Junyi Li, Chester, NJ (US); Jianghong Luo, Skillman, NJ (US); Luca Blessent, Whitehouse Station, NJ (US); Karl Georg Hampel, Hoboken, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/020,044

(22) Filed: Sep. 14, 2020

(65) Prior Publication Data

US 2021/0084545 A1    Mar. 18, 2021

Related U.S. Application Data

(60) Provisional application No. 62/902,190, filed on Sep. 18, 2019.

(51) Int. Cl.
*H04W 36/00* (2009.01)
*H04W 74/08* (2009.01)
(Continued)

(52) U.S. Cl.
CPC ....... *H04W 36/0058* (2018.08); *H04L 5/0048* (2013.01); *H04L 41/0803* (2013.01); *H04W 74/0833* (2013.01)

(58) Field of Classification Search
CPC ... H04L 1/0026; H04L 1/0027; H04L 1/0057; H04L 5/0057; H04L 5/0048;
(Continued)

(56) References Cited

U.S. PATENT DOCUMENTS

| | | | |
|---|---|---|---|
| 2005/0153657 A1* | 7/2005 | Maruta | H04B 7/0617 455/63.4 |
| 2009/0175186 A1* | 7/2009 | Du | H04W 76/28 370/252 |

(Continued)

FOREIGN PATENT DOCUMENTS

WO    WO-2019024790 A1    2/2019

OTHER PUBLICATIONS

AT&T: "Route Changes Based on Intra-gNB Handover of IAB Node", 3GPP Draft; 3GPP TSG-RAN WG2 Meeting #103, R2-1812405—Route Changes Based on Intra-gNB Handover of IAB Node, 3rd Generation Partnership Project (3GPP), Mobile Competence Centre; 650, Route Des Lucioles, F-06921 Sophia-Antipolis, vol. RAN WG2, No. Gothenburg, Sweden; Aug. 20, 2018-Aug. 24, 2018, Aug. 10, 2018 (Aug. 10, 2018), XP051522005, pp. 1-4, Retrieved from the Internet: URL: http://www.3gpp.org/ftp/tsg%5Fran/WG2%5FRL2/TSGR2%5F103/Docs/R2%2D1812405%2Ezip, [retrieved on Aug. 10, 2018], pp. 2-3.
(Continued)

*Primary Examiner* — Ian N Moore
*Assistant Examiner* — Sun Jong Kim
(74) *Attorney, Agent, or Firm* — Harrity & Harrity, LLP

(57) ABSTRACT

A child node in a wireless multi-hop network may receive a configuration for transmission of an uplink reference signal for a handover procedure; transmit the uplink reference signal according to the configuration; and receive a handover command or monitor for a downlink reference signal for the handover procedure based at least in part on transmitting the uplink reference signal.

30 Claims, 11 Drawing Sheets

(51) Int. Cl.
*H04L 5/00* (2006.01)
*H04L 41/0803* (2022.01)

(58) Field of Classification Search
CPC ..... H04L 5/0091; H04B 7/0626; H04B 7/063; H04B 7/0623; H04B 7/0632; H04B 7/0645; H04W 56/0005; H04W 56/001; H04W 56/0015; H04W 56/002; H04W 56/0025

See application file for complete search history.

(56) References Cited

U.S. PATENT DOCUMENTS

| | | | | |
|---|---|---|---|---|
| 2012/0113943 | A1* | 5/2012 | Jung | H04W 36/0016 370/329 |
| 2013/0195025 | A1* | 8/2013 | Chatterjee | H04B 7/0623 370/329 |
| 2014/0112260 | A1* | 4/2014 | Sorrentino | H04W 52/325 370/329 |
| 2014/0148182 | A1* | 5/2014 | Jeong | H04L 5/0094 455/452.1 |
| 2015/0071191 | A1* | 3/2015 | Kim | H04L 5/0035 370/329 |
| 2016/0330789 | A1* | 11/2016 | Goto | H04W 48/20 |
| 2016/0353432 | A1* | 12/2016 | Xu | H04W 72/0406 |
| 2017/0005758 | A1* | 1/2017 | Baldemair | H04L 1/1825 |
| 2017/0331577 | A1 | 11/2017 | Parkvall et al. | |
| 2017/0353913 | A1* | 12/2017 | Sun | H04W 64/003 |
| 2018/0115940 | A1 | 4/2018 | Abedini et al. | |
| 2018/0199328 | A1* | 7/2018 | Sang | H04W 36/06 |
| 2019/0089420 | A1* | 3/2019 | Koskela | H04B 7/088 |
| 2019/0357271 | A1* | 11/2019 | Yan | H04L 41/0654 |
| 2020/0068616 | A1* | 2/2020 | Qian | H04W 74/002 |
| 2020/0374813 | A1* | 11/2020 | Feng | H04W 52/146 |
| 2021/0160853 | A1* | 5/2021 | Gao | H04W 72/046 |
| 2021/0321315 | A1 | 10/2021 | Yi et al. | |
| 2021/0329556 | A1* | 10/2021 | Kim | H04W 52/0235 |
| 2021/0377805 | A1* | 12/2021 | Liu | H04W 28/12 |
| 2021/0400508 | A1* | 12/2021 | Ohara | H04W 36/0085 |
| 2022/0141686 | A1* | 5/2022 | Korhonen | H04L 5/0048 370/252 |

OTHER PUBLICATIONS

International Search Report and Written Opinion—PCT/US2020/050879—ISA/EPO—dated Nov. 9, 2020.
ZTE: "Discussion on IAB Topology Adaptation", 3GPP Draft, 3GPP TSG-RAN WG2 NR AdHoc 1807, R3-183688—Discussion on IAB Topology Adaptation, 3rd Generation Partnership Project (3GPP), Mobile Competence Centre; 650, Route Des Lucioles; F-06921 Sophia-Antipolis Cedex; France, vol. RAN WG2, No. Montreal, Canada; Jul. 2, 2018-Jul. 6, 2018, Jul. 1, 2018 (Jul. 1, 2018), XP051467976, 4 Pages, Retrieved from the Internet: http://www.3gpp.org/ftp/Meetings%5F3GPP%5FSYNC/RAN3/Docs, [retrieved on Jul. 1, 2018], pp. 2.3.

* cited by examiner

UPLINK-CENTRIC HANDOVER IN A WIRELESS MULTI-HOP NETWORK

CROSS-REFERENCE TO RELATED APPLICATION

This patent application claims priority to U.S. Provisional Patent Application No. 62/902,190, filed on Sep. 18, 2019, entitled "UPLINK-CENTRIC HANDOVER IN A WIRELESS MULTI-HOP NETWORK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for uplink-centric handover in a wireless multi-hop network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a child node in a wireless multi-hop network, may include receiving a configuration for transmission of an uplink reference signal for a handover procedure; transmitting the uplink reference signal according to the configuration; and receiving a handover command or monitoring for a downlink reference signal for the handover procedure based at least in part on transmitting the uplink reference signal.

In some aspects, a method of wireless communication, performed by a neighbor node in a wireless multi-hop network, may include receiving a configuration for reception of an uplink reference signal for a handover procedure; monitoring for the uplink reference signal according to the configuration; and transmitting a measurement report to a control node in the wireless multi-hop network or modifying a transmission mode for a downlink reference signal for the handover procedure based at least in part on receiving the uplink reference signal.

In some aspects, a method of wireless communication, performed by a control node in a wireless multi-hop network, may include transmitting, to a child node in the wireless multi-hop network, a transmission configuration for transmission of an uplink reference signal for a handover procedure; transmitting, to a neighbor node in the wireless multi-hop network, a reception configuration for reception of the uplink reference signal for the handover procedure; receiving a measurement report based at least in part on the uplink reference signal for the handover procedure; and initiating the handover procedure based at least in part on receiving the measurement report.

In some aspects, a child node for wireless communication may include memory and one or more processors operatively coupled to the memory. The memory and the one or more processors may be configured to receive a configuration for transmission of an uplink reference signal for a handover procedure; transmit the uplink reference signal according to the configuration; and receive a handover command or monitor for a downlink reference signal for the handover procedure based at least in part on transmitting the uplink reference signal.

In some aspects, a neighbor node for wireless communication may include memory and one or more processors operatively coupled to the memory. The memory and the one or more processors may be configured to receive a configuration for reception of an uplink reference signal for a handover procedure; monitor for the uplink reference signal according to the configuration; and transmit a measurement report to a control node in the wireless multi-hop network or modify a transmission mode for a downlink reference signal for the handover procedure based at least in part on receiving the uplink reference signal.

In some aspects, a control node for wireless communication may include memory and one or more processors operatively coupled to the memory. The memory and the one or more processors may be configured to transmit, to a child node in the wireless multi-hop network, a transmission configuration for transmission of an uplink reference signal for a handover procedure; transmit, to a neighbor node in the wireless multi-hop network, a reception configuration for reception of the uplink reference signal for the handover procedure; receive a measurement report based at least in part on the uplink reference signal for the handover procedure; and initiate the handover procedure based at least in part on receiving the measurement report.

In some aspects, a non-transitory computer-readable medium may store one or more instructions for wireless communication. The one or more instructions, when executed by one or more processors of a child node, may cause the one or more processors to: receive a configuration for transmission of an uplink reference signal for a handover procedure; transmit the uplink reference signal according to the configuration; and receive a handover command or monitor for a downlink reference signal for the handover procedure based at least in part on transmitting the uplink reference signal.

In some aspects, a non-transitory computer-readable medium may store one or more instructions for wireless communication. The one or more instructions, when executed by one or more processors of a neighbor node, may cause the one or more processors to: receive a configuration for reception of an uplink reference signal for a handover procedure; monitor for the uplink reference signal according to the configuration; and transmit a measurement report to a control node in the wireless multi-hop network or modify a transmission mode for a downlink reference signal for the handover procedure based at least in part on receiving the uplink reference signal.

In some aspects, a non-transitory computer-readable medium may store one or more instructions for wireless communication. The one or more instructions, when executed by one or more processors of a control node, may cause the one or more processors to: transmit, to a child node in the wireless multi-hop network, a transmission configuration for transmission of an uplink reference signal for a handover procedure; transmit, to a neighbor node in the wireless multi-hop network, a reception configuration for reception of the uplink reference signal for the handover procedure; receive a measurement report based at least in part on the uplink reference signal for the handover procedure; and initiate the handover procedure based at least in part on receiving the measurement report.

In some aspects, an apparatus for wireless communication may include means for receiving a configuration for transmission of an uplink reference signal for a handover procedure; means for transmitting the uplink reference signal according to the configuration; and means for receiving a handover command or means for monitoring for a downlink reference signal for the handover procedure based at least in part on transmitting the uplink reference signal.

In some aspects, an apparatus for wireless communication may include means for receiving a configuration for reception of an uplink reference signal for a handover procedure; means for monitoring for the uplink reference signal according to the configuration; and means for transmitting a measurement report to a control node in the wireless multi-hop network or modifying a transmission mode for a downlink reference signal for the handover procedure based at least in part on receiving the uplink reference signal.

In some aspects, an apparatus for wireless communication may include means for transmitting, to a child node in the wireless multi-hop network, a transmission configuration for transmission of an uplink reference signal for a handover procedure; means for transmitting, to a neighbor node in the wireless multi-hop network, a reception configuration for reception of the uplink reference signal for the handover procedure; means for receiving a measurement report based at least in part on the uplink reference signal for the handover procedure; and means for initiating the handover procedure based at least in part on receiving the measurement report.

Aspects generally include a method, apparatus, system, computer program product, non-transitory computer-readable medium, user equipment, base station, wireless communication device, child node, neighbor node, control node, integrated access and backhaul (IAB) node, IAB donor, central unit, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
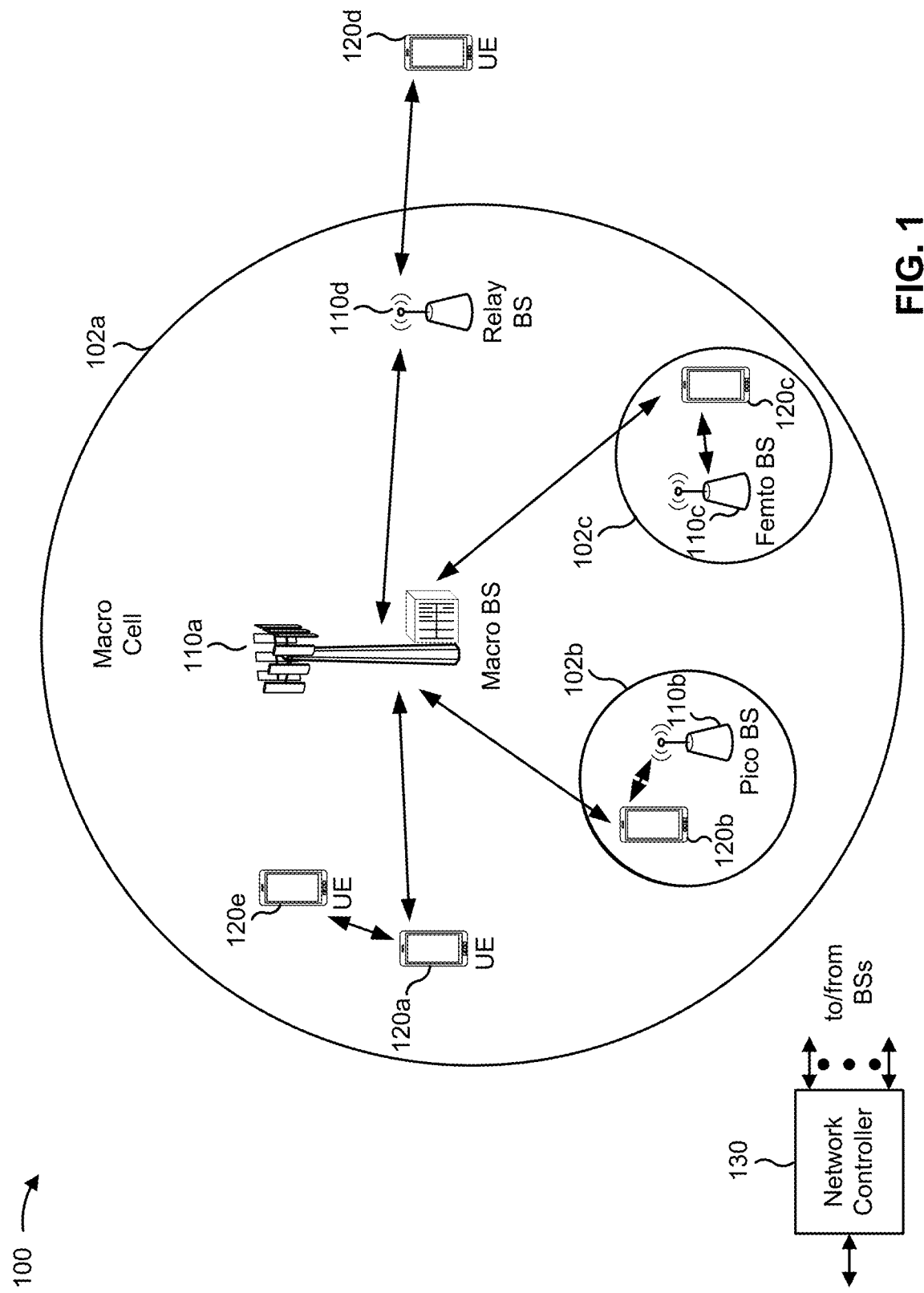
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
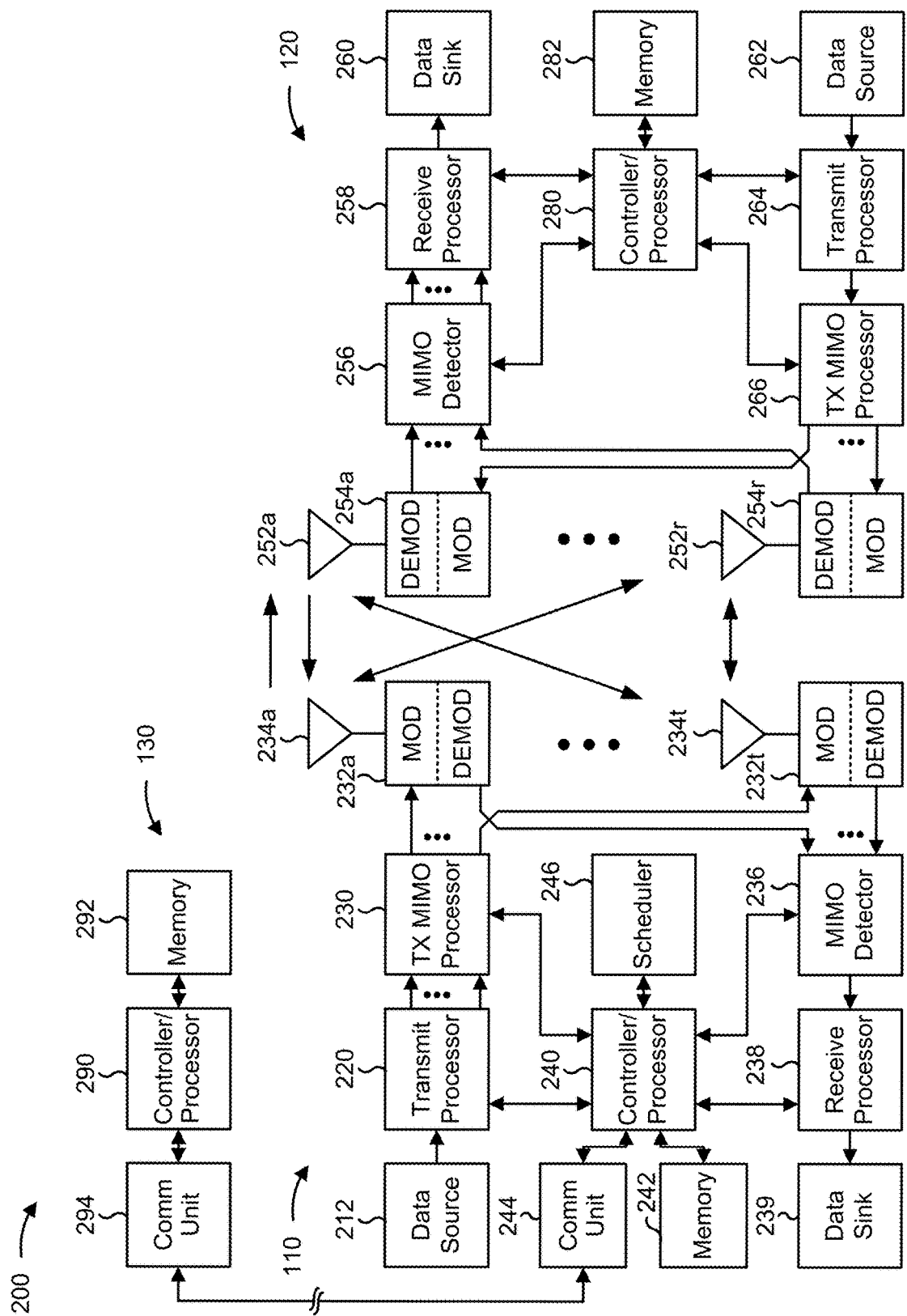
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with uplink-centric handover in a wireless multi-hop network, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, process 1100 of FIG. 11, and/or other processes as described herein. A scheduler 246 may schedule UEs for data transmission on the downlink and/or uplink.

In some aspects, the components described in connection with network controller 130 and/or base station 110 may be included in a central unit (CU) of an IAB donor, the components described in connection with base station 110 may be included in a distributed unit (DU) of an IAB donor and/or an IAB node, and/or the components described in connection with UE 120 may be included in a mobile termination (MT) of an IAB node.

In some aspects, a child node (e.g., an IAB node, a UE 120, and/or the like) in a wireless multi-hop network may include means for receiving a configuration for transmission of an uplink reference signal for a handover procedure; means for transmitting the uplink reference signal according to the configuration; means for receiving a handover command or means for monitoring for a downlink reference signal for the handover procedure based at least in part on transmitting the uplink reference signal; and/or the like. In some aspects, such means may include one or more components of UE 120 (which may correspond to an MT of an IAB node) described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a neighbor node (e.g., an IAB node) in a wireless multi-hop network may include means for receiving a configuration for reception of an uplink reference signal for a handover procedure; means for monitoring for the uplink reference signal according to the configuration; means for transmitting a measurement report to a control node in the wireless multi-hop network or modifying a transmission mode for a downlink reference signal for the handover procedure based at least in part on receiving the uplink reference signal; and/or the like. In some aspects, such means may include one or more components of base station 110 (which may correspond to a DU of the neighbor node) described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a control node (e.g., an IAB donor, an IAB node, and/or the like) in a wireless multi-hop network may include means for transmitting, to a child node in the wireless multi-hop network, a transmission configuration for transmission of an uplink reference signal for a handover procedure; means for transmitting, to a neighbor node in the wireless multi-hop network, a reception configuration for reception of the uplink reference signal for the handover procedure; means for receiving a measurement report based at least in part on the uplink reference signal for the handover procedure; means for initiating the handover procedure based at least in part on receiving the measurement report; and/or the like. In some aspects, such means may include one or more components of base station 110 and/or network controller 130 (one or both of which may correspond to the control node) described in connection with FIG. 2, such as antenna 234, DEMOD 232, MIMO detector 236, receive processor 238, controller/processor 240, transmit processor 220, TX MIMO processor 230, MOD 232, antenna 234, controller/processor 290, memory 292, communication unit 294, and/or the like.

As indicated above, FIG. 2 is provided as an example. Other examples may differ from what is described with regard to FIG. 2.

Figure 3:
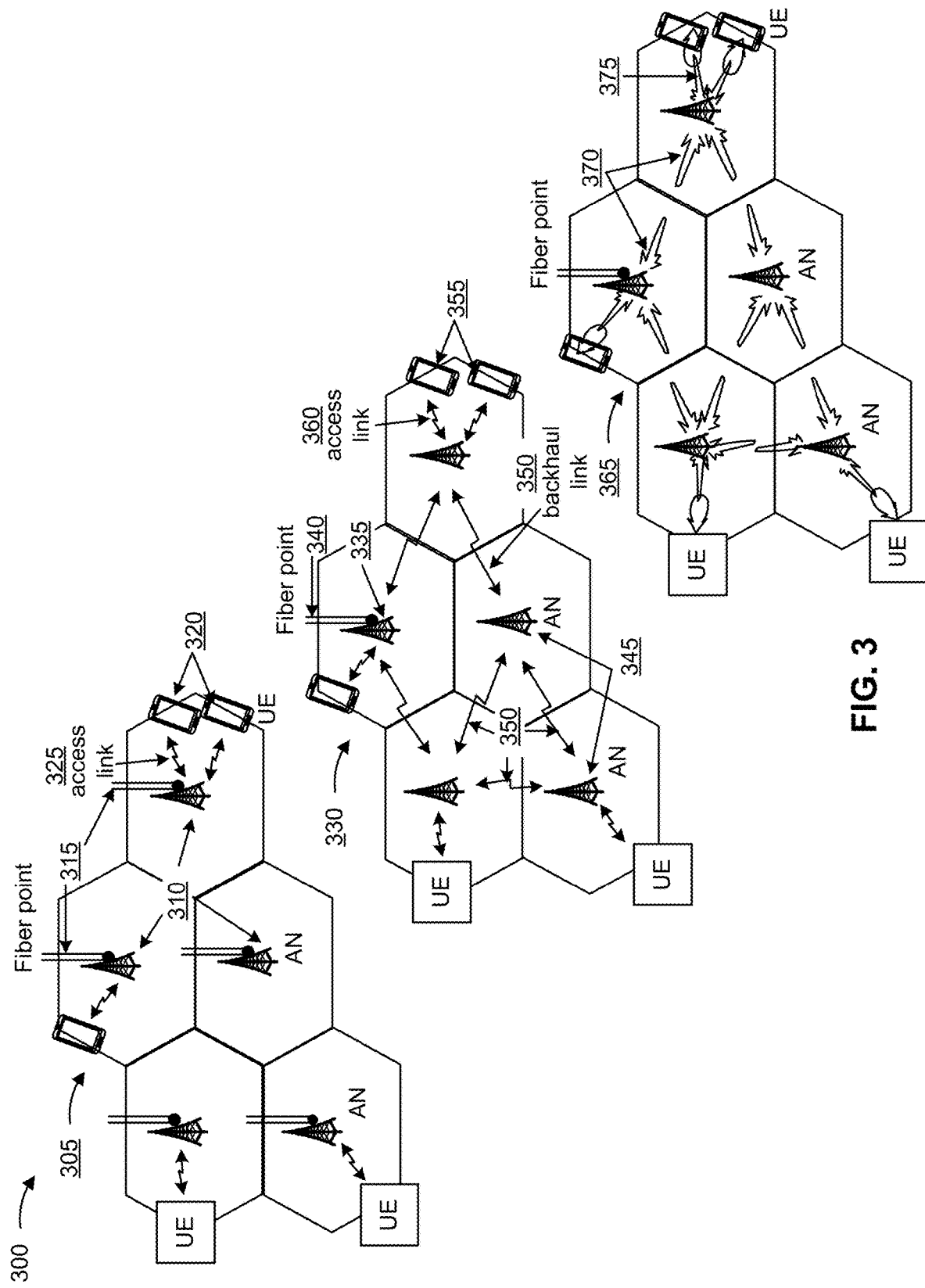
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. An IAB network is a type of wireless multi-hop network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations, IAB nodes (or IAB-nodes), and/or the like. The non-anchor base station 345 may communicate directly with or indirectly with (e.g., via one or more non-anchor base stations 345) the anchor base station 335 via one or more backhaul links 350 to form a backhaul path (or route) to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
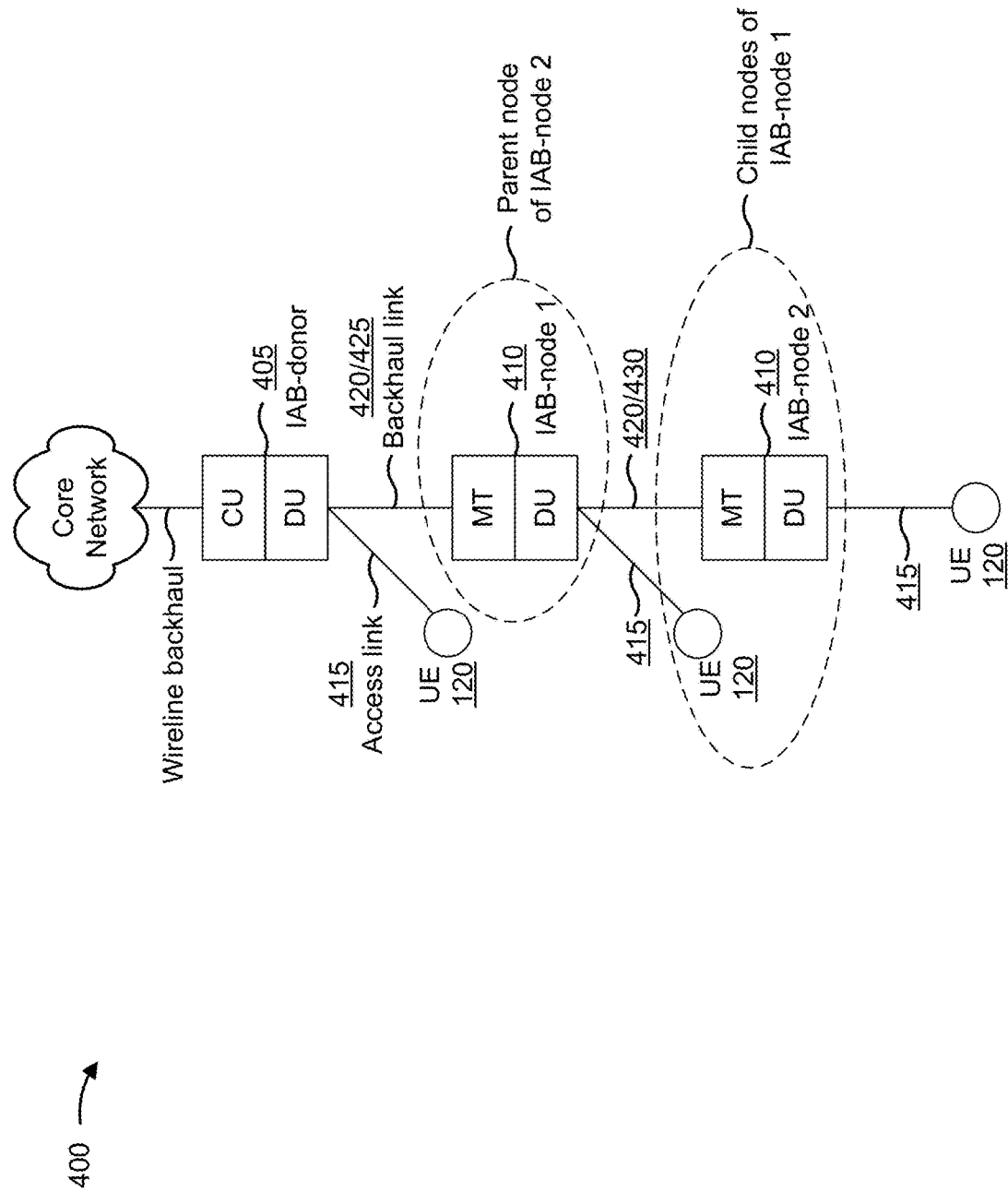
FIG. 4 is a diagram illustrating an example of an integrated access and backhaul (IAB) network architecture, in accordance with various aspects of the present disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor 405) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide an access and mobility management function (e.g., AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message and/or the like). In some aspects, a control and/or configuration message may be carried via an F1 application protocol (F1-AP) interface.

As further shown in FIG. 4, the IAB network may include IAB nodes 410 (shown as IAB-node 1 and IAB-node 2) that connect to the core network via the IAB donor 405. As shown, an IAB node 410 may include mobile termination (MT) functions (sometimes referred to as UE functions (UEF)), and may include DU functions (sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. As used herein, a node or a wireless node may refer to an IAB donor 405 or an IAB node 410.

In an IAB network, network resources for wireless communications (e.g., time resources, frequency resources, spatial resources, and/or the like) may be shared between a parent link 425 of an IAB node 410 (shown as link 420/425 for IAB-node 1) and a child link 430 of the IAB node 410 (shown as link 420/430 for IAB-node 1). When an IAB node 410 uses time division multiplexing (TDM) between a parent link 425 and a child link 430, the IAB node 410 is subject to a half duplex constraint, meaning that the IAB node 410 cannot transmit and receive information at the same time (e.g., cannot concurrently communicate via a parent link 425 of the IAB node 410 and a child link 430 of the IAB node 410). This constraint may lead to high latency for communications.

To reduce latency, increase robustness, and expand coverage of an IAB network, the IAB network may be over-deployed. For example, there may be multiple IAB donors 405 and/or IAB nodes 410 with overlapping coverage, there may be multiple routes from a particular UE 120 and/or IAB node 410 to another IAB node and/or to the IAB donor 405, and/or the like. For example, because millimeter wave communications have high signal attenuation during propagation, IAB nodes 410 with overlapping coverage may be deployed to expand coverage in the IAB network and mitigate such signal attenuation. Furthermore, because millimeter wave communications are susceptible to link blockage and link failure, IAB nodes 410 with overlapping coverage may be deployed to improve robustness of the IAB network.

In an over-deployed IAB network, different IAB nodes 410 may have different operating modes depending on, for example, a number of child nodes and/or UEs 120 served by the IAB node 410, an amount of traffic served by the IAB node 410, a power status of the IAB node 410 (e.g., whether the IAB node 410 is operating using battery power or alternating current (AC) power, a remaining battery life of the IAB node 410, and/or the like), a power saving mode of the IAB node 410, and/or the like. To conserve energy and battery power, an IAB node 410 may enter an operating mode with low energy consumption when network activity (e.g., a number of child nodes and/or UEs 120 to be served, an amount of network traffic, and/or the like) in a coverage area of the IAB node 410 is low and/or if other IAB nodes 410 in that coverage area are capable of handling the network activity. Conversely, if network activity in a coverage area of an IAB node 410 is high and/or if other IAB nodes 410 in that coverage area are not capable of handling the network activity (or are not present in the coverage area), then the IAB node 410 may enter an operating mode with high energy consumption.

During a handover procedure, a UE 120 and/or a child node may be handed over from a serving node (e.g., a first parent node) to a target node (e.g., a second parent node). During a cell selection procedure and/or a cell reselection procedure, a target node may be selected to serve a UE 120 and/or a child node. In an over-deployed IAB network, there may be multiple neighbor nodes that satisfy a handover condition (e.g., criteria) and/or a cell selection condition, and that are candidates for the target node. However, the multiple neighbor nodes may have different operating modes, such that selection of a first neighbor node over a second neighbor node provides poorer performance even if the first neighbor node is associated with better parameters (e.g., an RSRP parameter and/or the like) for handover or cell selection as compared to the second neighbor node. For example, the first neighbor node may be in a power saving mode, may be operating using battery power, may have low remaining battery life, may have a long route to an IAB donor 405, and/or the like. In such cases, selection of the first neighbor node using traditional procedures and/or parameters for handover or cell selection would result in worse performance than selection of the second neighbor node. Some techniques and apparatuses described herein account for operating modes of neighbor nodes when performing a handover procedure and/or a cell selection procedure (e.g., including a cell reselection procedure), thereby improving performance of the IAB network.

As indicated above, FIG. 4 is provided as an example. Other examples may differ from what is described with regard to FIG. 4.

Figure 5:
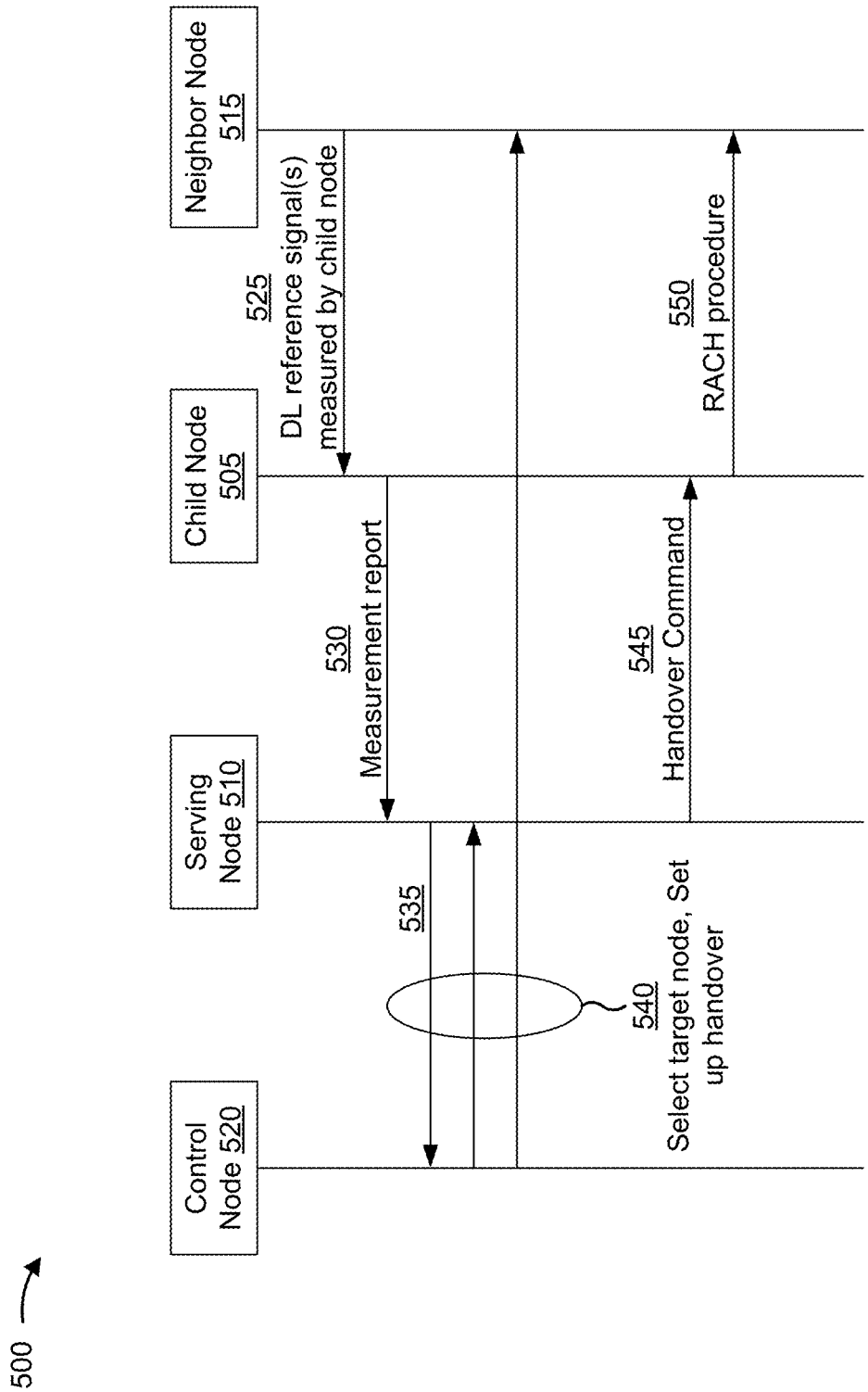
FIG. 5 is a diagram illustrating an example of a downlink-centric handover procedure in an IAB network, in accordance with various aspects of the present disclosure.

FIG. 5 is a diagram illustrating an example 500 of a downlink-centric handover procedure in an IAB network, in accordance with various aspects of the present disclosure.

As shown in FIG. 5, a downlink-centric handover procedure in an IAB network may involve a child node 505 (e.g., a UE, an IAB node, and/or the like), a serving node 510 that serves the child node 505 prior to handover, a neighbor node 515 (e.g., selected from a set of neighbor nodes) that serves the child node 505 as a target node after handover, and a control node 520. The control node 520 may communicate with the serving node 510 and the neighbor node 515 to initiate, set up, and/or otherwise assist in or instruct on the handover procedure. In some aspects, the control node 520 may be the same as the serving node 510 (e.g., operations described herein as being performed by the control node 520 may be performed by the serving node 510). In some aspects, the control node 520 may be a parent node of the serving node 510 and/or a parent node of the neighbor node 515. In some aspects, the control node 520 may be an IAB donor 405 (e.g., a CU of an IAB donor 405).

As shown by reference number 525, in a downlink-centric handover procedure, the child node 505 may receive one or more downlink (DL) reference signals from a set of neighbor nodes including the neighbor node 515. The one or more downlink reference signals may include, for example, one or more synchronization signal blocks (SSBs), one or more synchronization signal (SS) and/or physical broadcast channel (SS/PBCH) blocks, one or more channel state information reference signals (CSI-RSs), and/or the like. The child node 505 may perform measurements on the received downlink reference signals, such as RSRP measurements, RSRQ measurements, RSSI measurements, signal-to-interference-plus-noise ratio (SINR) measurements, and/or the like.

As shown by reference number 530, the child node 505 may report the measurements of the downlink reference signals of the set of neighbor nodes to the serving node 510, such as in a measurement report. As shown by reference number 535, the serving node 510 may provide the measurement report to the control node 520 responsible for selecting a neighbor node, from the set of neighbor nodes, as a target node for handover. As shown by reference number 540, the control node 520 may select the neighbor node 515 (e.g., if a handover condition is satisfied), and may communicate with the serving node 510 and the neighbor node 515 to initiate, set up, and/or otherwise assist in or instruct on the handover procedure.

As shown by reference number 545, the serving node 510 may transmit a handover command to the child node 505. The handover command may indicate the neighbor node 515 to which the child node 505 is to be handed over (e.g., as instructed by the control node 520 to the serving node 510). As shown by reference number 550, the child node 505 may perform a random access channel (RACH) procedure to connect to the neighbor node 515 based at least in part on receiving the handover command that identifies the neighbor node 515. After the handover procedure is complete, the child node 505 may be served by the neighbor node 515 and not the serving node 510.

The handover procedure shown in FIG. 5 is an example of a downlink-centric handover procedure, where handover is initiated based at least in part on a downlink reference signal transmitted by a neighbor node and monitored by a child node (e.g., as described above in connection with reference number 525). In some cases, using a downlink-centric handover procedure may be inefficient. For example, when an IAB network is over-deployed, the number of child nodes expected to undergo handover (e.g., in a particular time period) may be less than the number of neighbor nodes that are potential candidates to be a target node for the handover. Additionally, or alternatively, one or more neighbor nodes may be operating in a low energy consumption state due to serving a small number of child nodes and/or a small amount of network traffic, and thus the number of child nodes expected to undergo handover (e.g., in a particular time period) may be less than the number of neighbor nodes that are potential candidates to be a target node for the handover.

In these example cases, an uplink-centric handover procedure may be more efficient than a downlink-centric handover procedure. In an uplink-centric handover procedure, handover may be initiated based at least in part on an uplink reference signal transmitted by a child node and monitored by one or more neighbor nodes. Using an uplink-centric handover procedure may conserve network resources as compared to a downlink-centric handover procedure, due to a number of uplink reference signals to be transmitted by child nodes and monitored by neighbor nodes in an uplink-centric handover procedure being less than a number of downlink reference signals to be transmitted by neighbor nodes and monitored by child nodes in a downlink-centric handover procedure. Furthermore, a neighbor node in a power saving mode may consume less power in an uplink-centric handover procedure because less power is needed for the neighbor node to receive a reference signal as compared to transmitting a reference signal. In some cases, such power consumption can be further reduced by configuring the child node and the neighbor node regarding transmission and reception of uplink reference signals. Some techniques and apparatuses described herein may be used to achieve uplink-centric handover.

As indicated above, FIG. 5 is provided as an example. Other examples may differ from what is described with regard to FIG. 5.

Figure 6:
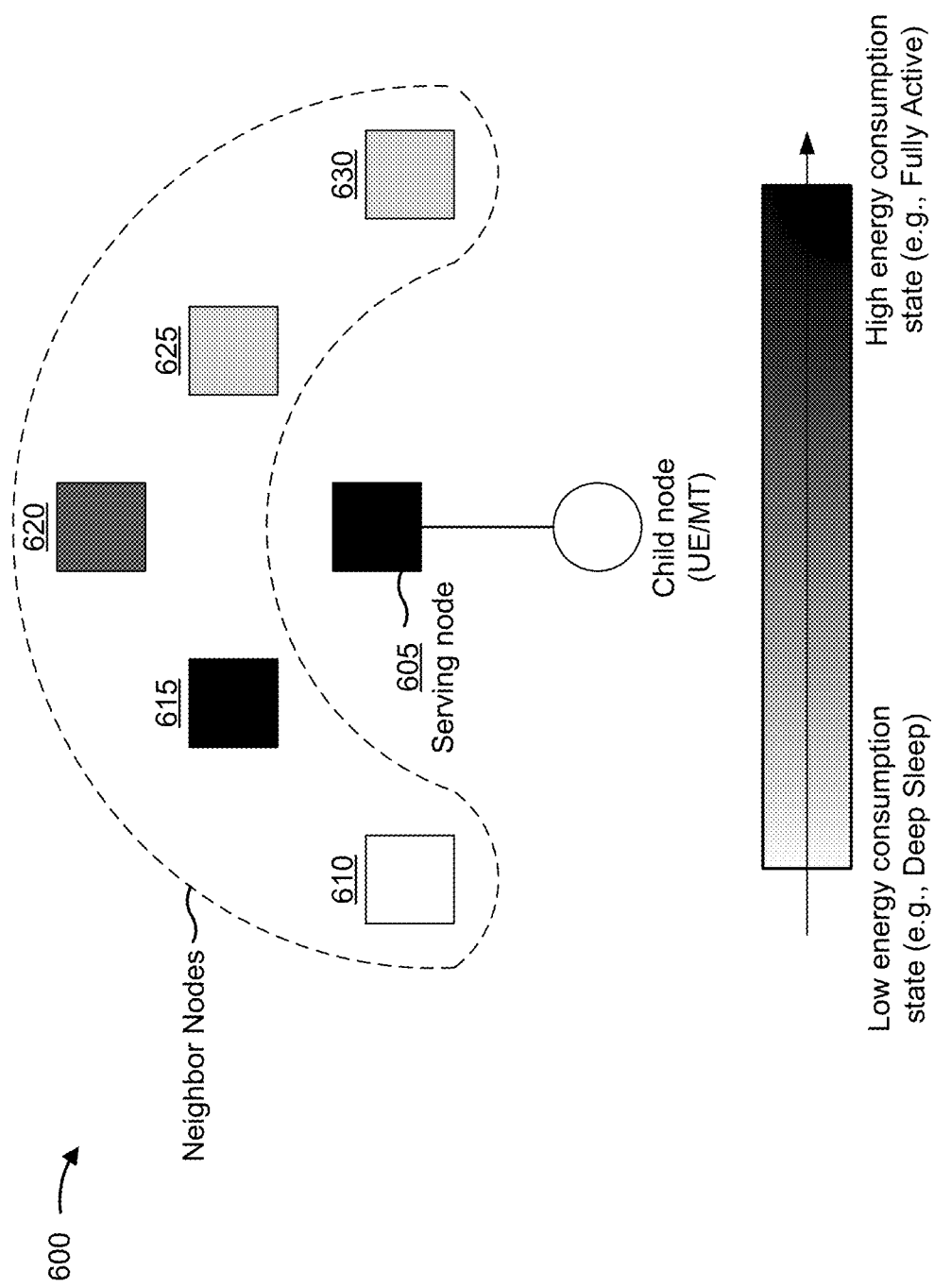
FIG. 6 is a diagram illustrating an example of various operating modes of nodes in an IAB network, in accordance with various aspects of the present disclosure.

FIG. 6 is a diagram illustrating an example 600 of various operating modes of nodes in an IAB network, in accordance with various aspects of the present disclosure.

As shown in FIG. 6, different nodes (e.g., IAB nodes 410) in an IAB network may operate in different operating modes (e.g., at a given point in time), sometimes referred to as power saving modes. For example, a serving node 605 of a child node (e.g., a UE/MT) may operate in a high energy consumption state (e.g., with a power saving mode disabled, with one or more power saving mode operations disabled, and/or the like). The serving node 605 may operate in the high energy consumption state due to serving a number (e.g., a quantity) of child nodes that satisfies a threshold, due to serving an amount of network traffic that satisfies a threshold, due to being powered by AC power, due to having a remaining amount of battery life that satisfies a threshold, and/or the like. In the high energy consumption state, the serving node 605 may be fully active, may have more features enabled than a node in a lower energy consumption state, may perform one or more operations (e.g., transmissions, reference signal transmissions, paging, and/or the like) more frequently than a node in a lower energy consumption state, and/or the like.

As another example, a first neighbor node 610 may operate in a low energy consumption state (e.g., with a power saving mode enabled, with one or more power saving mode operations enabled, and/or the like). The first neighbor node 610 may operate in the low energy consumption state due to serving a number of child nodes that does not satisfy a threshold, due to serving an amount of network traffic that does not satisfy a threshold, due to being powered by battery power, due to having a remaining amount of battery life that does not satisfy a threshold, and/or the like. In the low energy consumption state, the first neighbor node 610 may be in a deep sleep mode and/or a power saving mode, may have fewer features enabled than a node in a higher energy consumption state, may perform one or more operations (e.g., transmissions, reference signal transmissions, paging, and/or the like) less frequently than a node in a higher energy consumption state, may operate with limited service (e.g., may provide only emergency service), and/or the like. In some aspects, in the low energy consumption state, the first neighbor node 610 may be powered off (e.g., for battery charging). In some aspects, the operating mode may include a transmission mode, and a neighbor node in a low energy consumption state may send transmissions (e.g., downlink reference signals) less frequently as compared to a high energy consumption state.

As further shown in FIG. 6, different neighbor nodes 615, 620, 625, and 630 may operate in different operating modes within a range of operating modes. For example, different operating modes may correspond to serving different numbers of child nodes (e.g., a number of child nodes that falls within a threshold range, that is greater than a threshold, that is less than a threshold, and/or the like), due to serving different amounts of network traffic (e.g., an amount of network traffic that falls within a threshold range, that is greater than a threshold, that is less than a threshold, and/or the like), due to being powered by battery power or by AC power, due to having different amounts of remaining battery life (e.g., an amount of remaining battery life that falls within a threshold range, that is greater than a threshold, that is less than a threshold, and/or the like), due to being in a charging state or not being in a charging state, and/or the like.

As described above, a neighbor node may operate in a low energy consumption state due to serving a small number of child nodes and/or a small amount of network traffic. As a result, the number of child nodes expected to undergo handover to or from the neighbor node (e.g., while the neighbor node is operating in the low energy consumption state) may be less than the number of neighbor nodes that are potential candidates to be a target node for the handover. Thus, as described above, network resources and power consumption of neighbor nodes may be conserved by using an uplink-centric handover procedure.

As indicated above, FIG. 6 is provided as an example. Other examples may differ from what is described with regard to FIG. 6.

Figure 7:
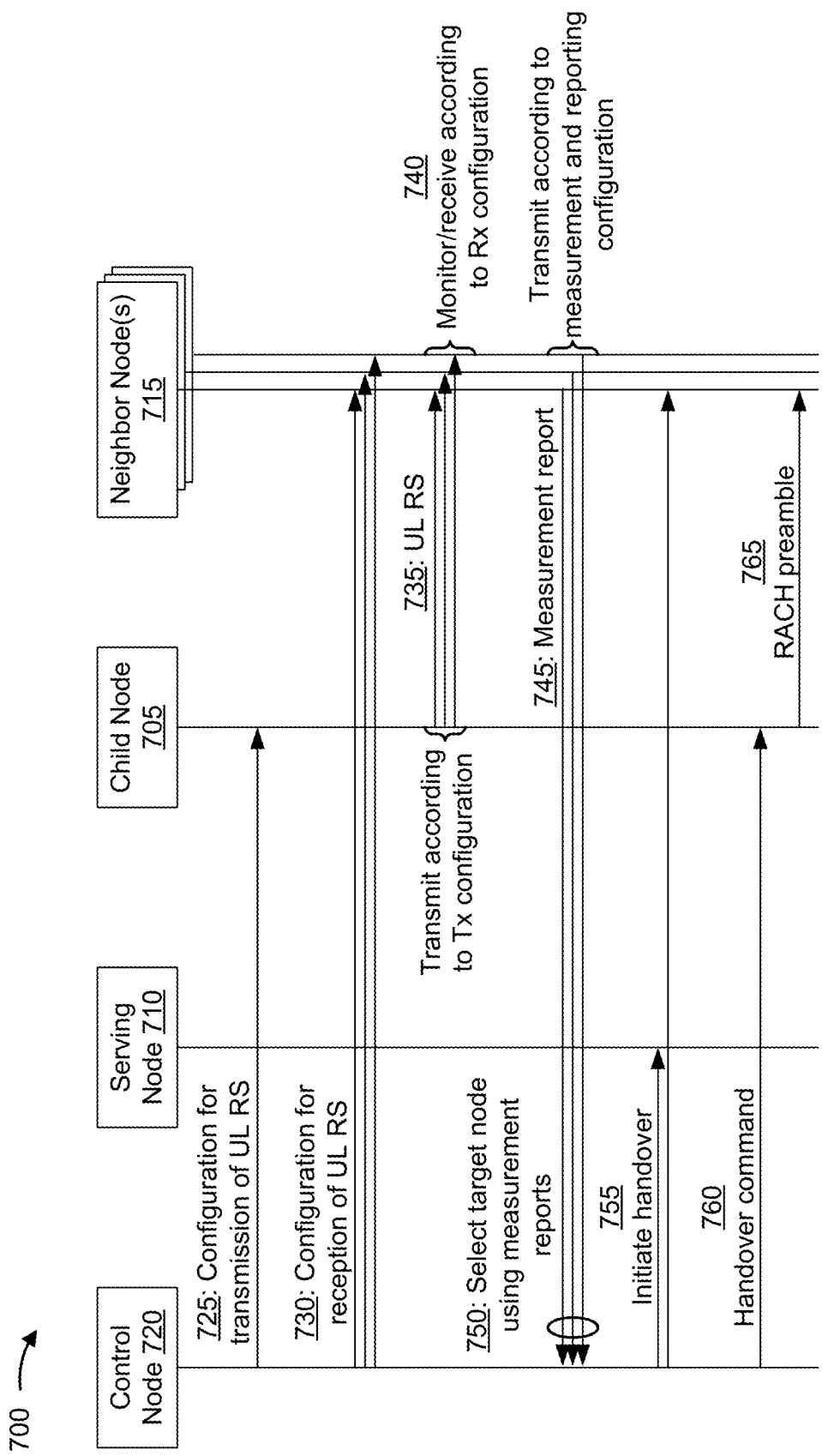
FIGS. 7 and 8 are diagrams illustrating examples of uplink-centric handover in a wireless multi-hop network, in accordance with various aspects of the present disclosure.

FIG. 7 is a diagram illustrating an example 700 of uplink-centric handover in a wireless multi-hop network, in accordance with various aspects of the present disclosure.

As shown in FIG. 7, a child node 705 (e.g., a UE, an IAB node 410, and/or the like) may be served by a serving node 710 (e.g., a parent node). The child node 705 may transmit uplink reference signals to a set of neighbor nodes 715 (referred to collectively as neighbor nodes 715 and individually as neighbor node 715). The serving node 710 and/or one or more neighbor nodes 715 may be controlled by a control node 720.

The nodes of FIG. 7 may correspond to nodes as described above in connection with FIG. 5. Thus, as described above in connection with FIG. 5, the child node 705 may include a UE, an IAB node (e.g., an MT function of an IAB node, a DU function of an IAB node, and/or the like), and/or the like. The serving node 710 may include an IAB node 410 (e.g., having a DU function for scheduling communications with the child node 705), an IAB donor 405 (e.g., having a CU), a parent node of the child node 705, and/or the like. The control node 720 may be the same as the serving node 710 (e.g., operations described herein as being performed by the control node 720 may be performed by the serving node 710), may be a parent node of the serving node 710 (and/or of one or more neighbor nodes 715), and/or may be an IAB donor 405 (e.g., a CU of an IAB donor 405).

As shown by reference number 725, the control node 720 may transmit, to the child node 705, a configuration for transmission of an uplink reference signal for a handover procedure. This configuration may be referred to as a transmission configuration. The transmission configuration may indicate one or more parameters for transmission of the uplink reference signal. For example, the transmission configuration may indicate one or more resources for transmission of the uplink reference signal (e.g., one or more time domain resources, one or more frequency domain resources, one or more spatial domain resources, and/or the like), a transmit power for transmission of the uplink reference signal, a beam configuration for transmission of the uplink reference signal (e.g., one or more beams via which the uplink reference signal is to be transmitted, a beam-sweeping pattern to be used for transmission of the uplink reference signal, a beam width, a number of beams, and/or the like), and/or the like. The transmission configuration may be transmitted via a radio resource control (RRC) message (e.g., when the uplink reference signal is transmitted by a UE or an MT function), an F1 application protocol (F1-AP) interface (e.g., when the uplink reference signal transmitted by a DU function), and/or the like.

As shown by reference number 730, the control node 720 may transmit, to one or more neighbor nodes 715, a configuration for reception of an uplink reference signal for a handover procedure. This configuration may be referred to as a reception configuration. The reception configuration may indicate one or more parameters for reception of the uplink reference signal. For example, the reception configuration may indicate one or more resources for monitoring for the uplink reference signal (e.g., one or more time domain resources, one or more frequency domain resources, one or more spatial domain resources, and/or the like), a beam configuration for monitoring for the uplink reference signal (e.g., one or more beams on which the uplink reference signal is to be monitored, a beam-sweeping pattern to be used for monitoring for the uplink reference signal, a beam width, a number of beams, and/or the like), a power saving mode configuration for a neighbor node 715 being configured, and/or the like. The reception configuration may be transmitted via an RRC message, an F1-AP interface, and/or the like.

In some aspects, the power saving mode configuration may indicate an active time period for the neighbor node 715 (e.g., during which the neighbor node 715 is in an active state, an awake state, a high energy consumption state, a high power state, and/or the like), an inactive time period for the neighbor node 715 (e.g., during which the neighbor node 715 is in an inactive state, a sleep state, a low energy consumption state, a low power state, and/or the like), an operating mode for the neighbor node 715, and/or the like.

In some aspects, the control node 720 may determine one or more parameters of the transmission configuration and/or the reception configuration based at least in part on information received from the child node 705 and/or a neighbor node 715. For example, the control node 720 may configure a transmit power for an uplink reference signal based at least in part on a location of the child node 705 and/or one or more locations corresponding to one or more neighbor nodes 715. In some aspects, the control node 720 may configure the transmit power such that the uplink reference signal is likely to propagate to the neighbor node(s) 715. Additionally, or alternatively, the control node 720 may align a transmission time of the uplink reference signal (e.g., a time domain resource for transmission of the uplink reference signal by the child node 705) and an active time period of the neighbor node 715 (e.g., a time domain resource during which the neighbor node 715 is in an active state and able to monitor for and/or receive the uplink reference signal). Additionally, or alternatively, the control node 720 may align a transmit beam direction, used by the child node 705 to transmit the uplink reference signal, and a receive beam direction used by the neighbor node 715 to monitor for the uplink reference signal.

As shown by reference number 735, the child node 705 may transmit one or more uplink reference signals according to the transmission configuration. For example, the child node 705 may transmit an uplink reference signal in one or more resources indicated by the transmission configuration, using a transmit power indicated by the transmission configuration, via one or more beams indicated by the transmission configuration (e.g., using a particular beam, a particular set of beams, a beam-sweeping pattern, and/or the like), and/or the like.

In some aspects, the uplink reference signal is a sounding reference signal (SRS). For example, the child node 705 may be a UE and/or may include an MT function of an IAB node. In this case, the UE or the MT function of the IAB node may transmit an SRS as the uplink reference signal. When the uplink reference signal is an SRS, the transmission configuration for configuring the SRS (e.g., an SRS configuration) may be transmitted via an RRC message, such as an RRC configuration message, an RRC reconfiguration message, and/or the like.

In some aspects, the uplink reference signal is an SSB or a CSI-RS. For example, the child node 705 may include a DU function of an IAB node. In this case, the DU function of the IAB node may transmit an SSB and/or a CSI-RS as the uplink reference signal. When the uplink reference signal is an SSB and/or a CSI-RS, the transmission configuration for configuring the SSB and/or the CSI-RS (e.g., an SSB configuration and/or a CSI-RS configuration) may be transmitted via an F1-AP interface between the control node 720 and the child node 705 (e.g., the DU function of the child node 705).

In some aspects, the child node 705 may transmit an uplink reference signal in multiple directions, such as by using beam-sweeping. In some aspects, the transmission configuration may indicate a beam-sweeping pattern to be used by the child node 705 to transmit the uplink reference signal, and the child node 705 may transmit the uplink reference signal according to the beam-sweeping pattern. In some cases, when transmitting the uplink reference signal, the child node 705 may transmit the uplink reference signal in multiple directions (e.g., over time) without waiting for a handover command between different transmissions of the uplink reference signal. Alternatively, the child node 705 may transmit the uplink reference signal in a first direction (or a first set of directions), and may then wait for a handover command (e.g., as described in more detail below in connection with reference number 760). If the child node 705 does not receive a handover command within a threshold amount of time, then the child node 705 may transmit the uplink reference signal in a second direction (or a second set of directions), and so on.

As shown by reference number 740, a neighbor node 715 may monitor for the uplink reference signal. In some aspects, the neighbor node 715 may monitor for the uplink reference signal according to the reception configuration. For example, the neighbor node 715 may monitor for an uplink reference signal in one or more resources indicated by the reception configuration, via one or more beams indicated by the reception configuration (e.g., using a particular beam, a particular set of beams, a beam-sweeping pattern, and/or the like), during an active time period of the neighbor node 715, and/or the like.

As shown by reference number 745, a neighbor node 715 may transmit a measurement report to the control node 720 based at least in part on receiving one or more uplink reference signals from the child node 705. The measurement report may indicate a parameter to be used for a handover decision, such as an RSRP parameter, an RSRQ parameter, an RSSI parameter, an SINR parameter, and/or the like. In some aspects, multiple neighbor nodes may transmit respective measurement reports to the control node 720 based at least in part on reception of an uplink reference signal from the child node 705.

In some aspects, the control node 720 may transmit, to the neighbor node 715, a measurement and reporting configuration that indicates a condition for transmitting the measurement report. In this case, the neighbor node 715 may transmit the measurement report to the control node 720 based at least in part on a determination that the condition is satisfied. For example, the condition may be that the measurement report is to be transmitted if an RSRP parameter, of an uplink reference signal transmitted by the child node 705 and measured by the neighbor node 715, satisfies a threshold (e.g., a threshold indicated in the measurement and reporting configuration). In this case, if the neighbor node 715 determines that a measured RSRP parameter of the uplink reference signal satisfies the threshold, then the neighbor node 715 may transmit a measurement report, associated with the uplink reference signal and the child node 705, to the control node 720. In some aspects, the measurement and reporting configuration may be transmitted via an RRC message, via an F1-AP interface, and/or the like.

As shown by reference number 750, the control node 720 may select a target node, from a set of neighbor nodes 715, based at least in part on measurement reports received from the set of neighbor nodes 715 (e.g., if a handover condition is satisfied). As shown by reference number 755, the control node 720 may initiate the handover procedure based at least in part on selecting a neighbor node 715 as the target node for handover. For example, the control node 720 may communicate with the serving node 710 and the neighbor node 715 to initiate, set up, and/or otherwise assist in or instruct on the handover procedure. For example, the control node 720 may transmit a handover request to the serving node 710 and/or may transmit a handover request to the neighbor node 715 selected as the target node. In some aspects, rather than setting up handover based at least in part on receiving one or more measurement reports, the control node 720 may instruct one or more neighbor nodes 715, from which the measurement report(s) are received, to modify a transmission mode (e.g., for downlink reference signals), as described in more detail below in connection with FIG. 8.

As shown by reference number 760, the control node 720 may transmit (e.g., via the serving node 710) a handover command to the child node 705. The handover command may indicate the neighbor node 715 to which the child node 705 is to be handed over (e.g., as instructed by the control node 720 to the serving node 710). In some aspects, the child node 705 may receive the handover command without transmitting a measurement report to the control node 720 or the serving node 710 (e.g., because the measurement report is transmitted by one or more neighbor nodes 715 for the uplink-centric handover procedure rather than by the child node 705 for a downlink-centric handover procedure). As shown by reference number 765, the child node 705 may perform a RACH procedure to connect to the neighbor node 715 (e.g., by transmitting a RACH preamble to the neighbor node 715) based at least in part on receiving the handover command that identifies the neighbor node 715. After the handover procedure is complete, the child node 705 may be served by the neighbor node 715 and not the serving node 710.

By using an uplink-centric handover procedure rather than a downlink-centric handover procedure, network resources may be conserved, resources of one or more neighbor nodes 715 may be conserved, and/or the like, as described above. In some aspects, the control node 720 may configure the child node 705 and/or the one or more neighbor nodes 715 regarding whether to use an uplink-centric handover procedure (e.g., described in connection with FIGS. 7 and 8) or a downlink-centric handover procedure (e.g., described in connection with FIG. 5).

As indicated above, FIG. 7 is provided as an example. Other examples may differ from what is described with respect to FIG. 7.

Figure 8:
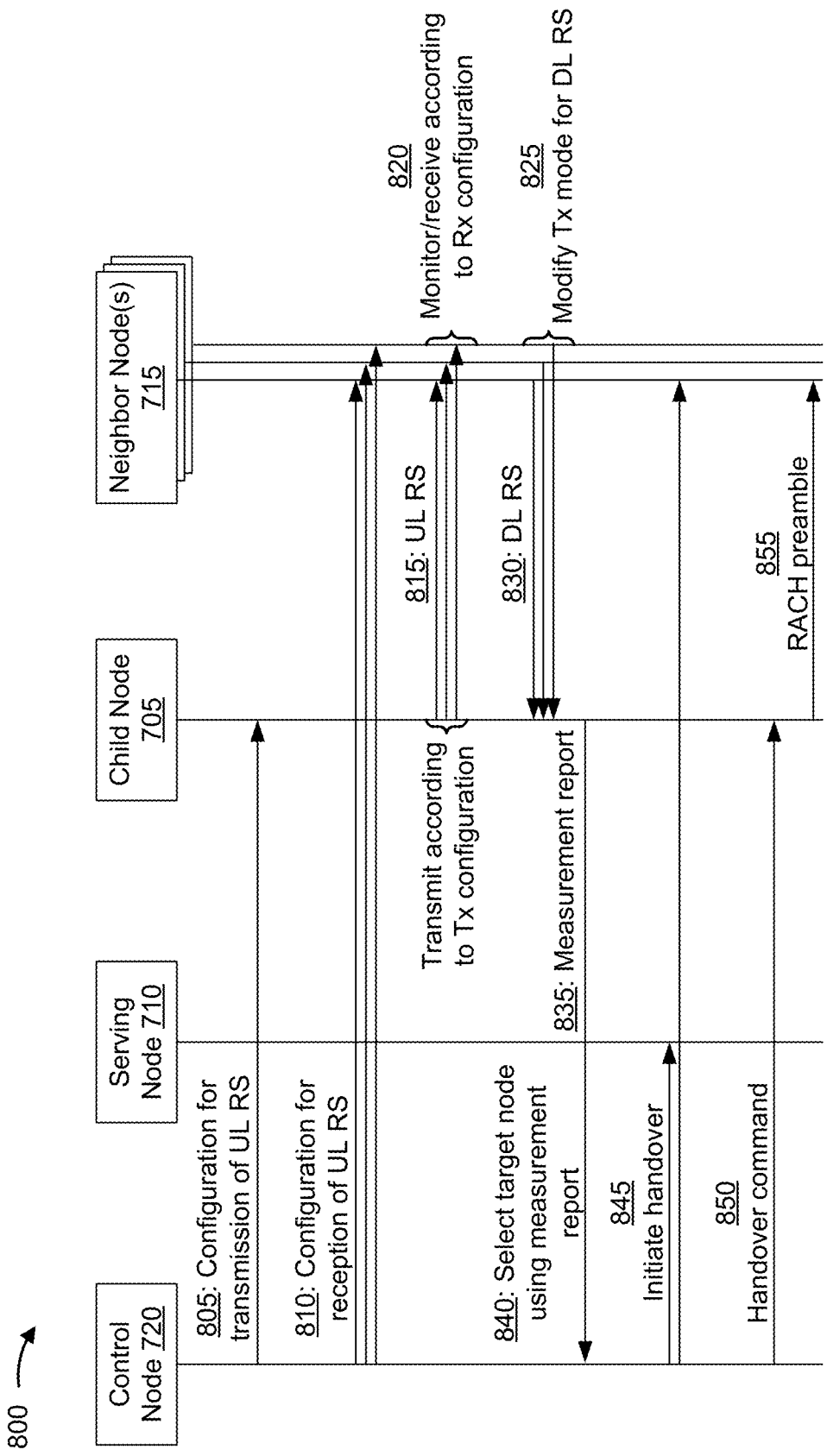

FIG. 8 is a diagram illustrating an example 800 of uplink-centric handover in a wireless multi-hop network, in accordance with various aspects of the present disclosure.

As shown in FIG. 8, a child node 705 (e.g., a UE, an IAB node 410, and/or the like) may be served by a serving node 710 (e.g., a parent node). The child node 705 may transmit uplink reference signals to a set of neighbor nodes 715 (referred to collectively as neighbor nodes 715 and individually as neighbor node 715). The serving node 710 and/or one or more neighbor nodes 715 may be controlled by a control node 720. The nodes of FIG. 8 may correspond to nodes as described above in connection with FIG. 7.

As shown by reference number 805, the control node 720 may transmit, to the child node 705, a transmission configuration for transmission of an uplink reference signal for a handover procedure, as described above in connection with reference number 725 of FIG. 7. As shown by reference number 810, the control node 720 may transmit, to one or more neighbor nodes 715, a reception configuration for reception of an uplink reference signal for a handover procedure, as described above in connection with reference number 730 of FIG. 7.

As shown by reference number 815, the child node 705 may transmit one or more uplink reference signals according to the transmission configuration, as described above in connection with reference number 735 of FIG. 7. In some cases, when transmitting the uplink reference signal, the child node 705 may transmit the uplink reference signal in multiple directions (e.g., over time) without waiting for a downlink reference signal between different transmissions of the uplink reference signal. Alternatively, the child node 705 may transmit the uplink reference signal in a first direction (or a first set of directions), and may then wait for a downlink reference signal (e.g., as described in more detail below in connection with reference number 830). If the child node 705 does not receive a downlink reference signal within a threshold amount of time, then the child node 705 may transmit the uplink reference signal in a second direction (or a second set of directions), and so on. As shown by reference number 820, a neighbor node 715 may monitor for the uplink reference signal, as described above in connection with reference number 740 of FIG. 7.

As shown by reference number 825, a neighbor node 715 may modify a transmission mode for a downlink reference signal for the handover procedure based at least in part on receiving the uplink reference signal. For example, prior to receiving the uplink reference signal, the neighbor node 715 may be in a power saving mode where downlink reference signals are transmitted less frequently. After receiving the uplink reference signal, the neighbor node 715 may disable the power saving mode (and/or one or more functions of the power saving mode), and may transmit downlink reference signal more frequently. In some aspects, the neighbor node 715 may modify the transmission mode based at least in part on a determination that the uplink reference signal satisfies a condition, such as an RSRP parameter of the uplink reference signal satisfying a threshold. In some aspects, the condition may be indicated to and/or configured for the neighbor node 715 by the control node 720 (e.g., in the reception configuration). Additionally, or alternatively, the neighbor node 715 may transmit a measurement report to the control node 720 based at least in part on the uplink reference signal (as described above in connection with FIG. 7), and the control node 720 may instruct the neighbor node 715 to modify the transmission mode based at least in part on the measurement report (e.g., the measurement report satisfying a condition, an RSRP parameter, indicated in the measurement report, satisfying a threshold, and/or the like).

As shown by reference number 830, the neighbor node 715 may transmit a downlink reference signal based at least in part on modifying the transmission mode. For example, the neighbor node 715 may transmit the downlink reference signal more frequently as compared to a time period prior to modifying the transmission mode. The downlink reference signal may include, for example, an SSB, a CSI-RS, and/or the like. The child node 705 may monitor for one or more downlink reference signals based at least in part on transmitting the uplink reference signal. For example, the child node 705 may monitor for downlink reference signals more frequently as compared to a time period prior to transmitting the uplink reference signal. In some aspects, the periodicity of monitoring prior to transmission of the uplink reference signal and/or after transmission of the uplink reference signal may be indicated to and/or configured for the child node 705 by the control node 720.

In some aspects, the neighbor node 715 may determine a transmit power for the downlink reference signal based at least in part on the uplink reference signal. For example, if the uplink reference signal is received with a lower signal power (e.g., a lower RSRP), then the neighbor node 715 may transmit the downlink reference signal with a higher transmit power, and if the uplink reference signal is received with a higher signal power (e.g., a higher RSRP), then the neighbor node 715 may transmit the downlink reference signal with a lower transmit power. In this way, the neighbor node 715 may conserve resources (e.g., battery power, processing resources, memory resources, and/or the like) while also facilitating successful reception of the downlink reference signal by the child node 705.

Additionally, or alternatively, the neighbor node 715 may determine a beam for transmission of the downlink reference signal (e.g., a transmit beam) based at least in part on the uplink reference signal. For example, the neighbor node 715 may identify a transmit beam that corresponds to a receive beam via which the uplink reference signal was received (and/or a strongest beam via which the uplink reference signal was received), and may transmit the downlink reference signal using the transmit beam. In this way, the neighbor node 715 may conserve resources of the neighbor node 715 (e.g., battery power, processing resources, memory resources, and/or the like) and may conserve network resources by transmitting the downlink reference signal using fewer beams (e.g., a single beam or a smaller set of beams). Similarly, the child node 705 may determine a receive beam to be used for monitoring for a downlink reference signal based at least in part on a transmit beam used by the child node 705 to transmit the uplink reference signal, thereby conserving resources of the child node 705 (e.g., as compared to monitoring multiple beams).

Additionally, or alternatively, the neighbor node 715 may determine one or more resources (e.g., time domain resources, frequency domain resources, spatial domain resources, and/or the like) for transmission of the downlink reference signal based at least in part on the uplink reference signal. For example, the neighbor node 715 may identify one or more downlink resources based at least in part on one or more uplink resources via which the uplink reference signal was received, and may transmit the downlink reference signal using the one or more downlink resources. In this case, the child node 705 may monitor for the downlink reference signal on one or more resources that correspond to a resource via which the uplink reference signal is transmitted.

As shown by reference number 835, the child node 705 may transmit a measurement report to the control node 720 (e.g., via the serving node 710) based at least in part on measuring one or more downlink reference signals. The measurement report may include, for example, an RSRP parameter, an RSRQ parameter, an RSSI parameter, an SINR parameter, and/or the like, for a set of downlink reference signals measured by the child node 705 (e.g., received from one or more neighbor nodes 715).

As shown by reference number 840, the control node 720 may select a target node, from a set of neighbor nodes 715, based at least in part on the measurement report received from the child node 705 (e.g., if a handover condition is satisfied). As shown by reference number 845, the control node 720 may initiate the handover procedure based at least in part on selecting a neighbor node 715 as the target node for handover, as described above in connection with reference number 755 of FIG. 7.

As shown by reference number 850, the control node 720 may transmit (e.g., via the serving node 710) a handover command to the child node 705, as described above in connection with reference number 760 of FIG. 7. As shown by reference number 855, the child node 705 may perform a RACH procedure to connect to the neighbor node 715 (e.g., by transmitting a RACH preamble to the neighbor node 715) based at least in part on receiving the handover command that identifies the neighbor node 715. After the handover procedure is complete, the child node 705 may be served by the neighbor node 715 and not the serving node 710. By using an uplink-centric handover procedure rather than a downlink-centric handover procedure, network resources may be conserved, resources of one or more neighbor nodes 715 may be conserved, and/or the like, as described above.

As indicated above, FIG. 8 is provided as an example. Other examples may differ from what is described with respect to FIG. 8.

Figure 9:
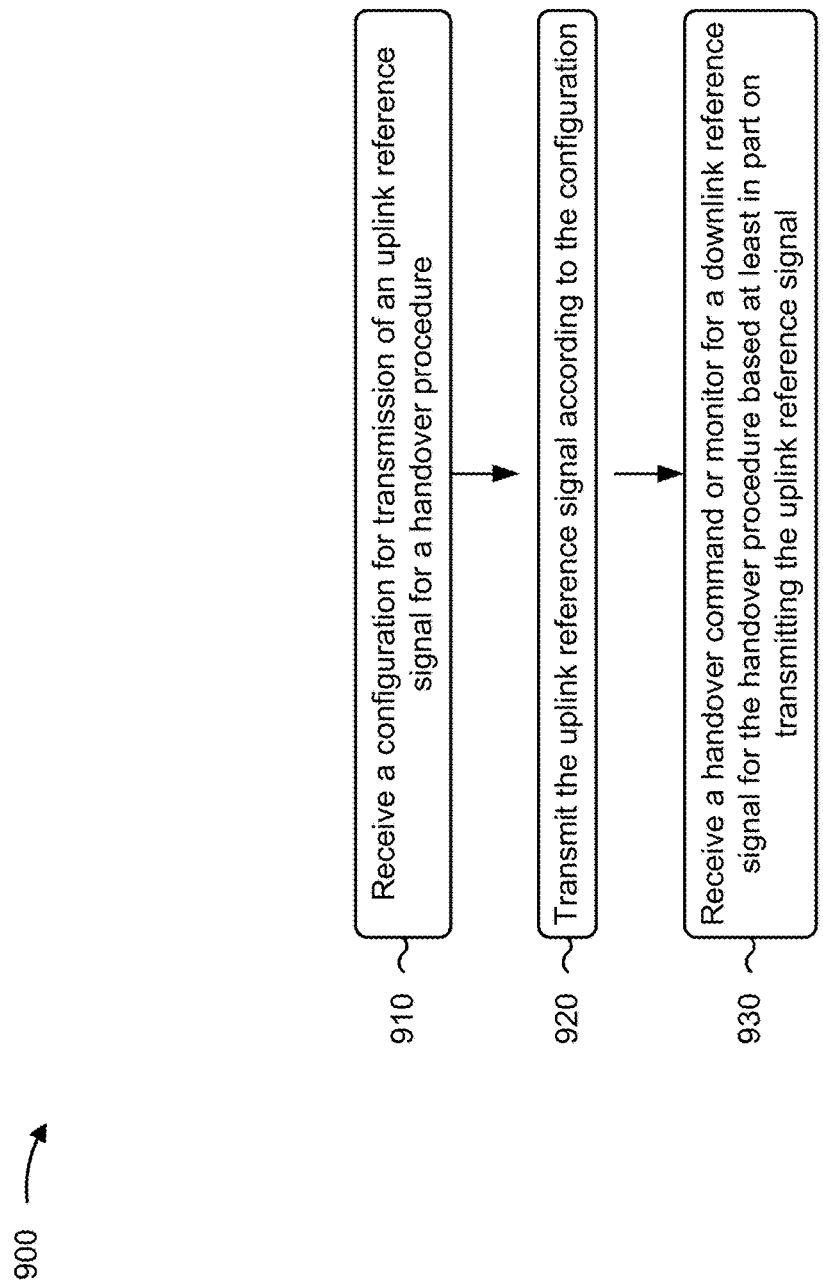
FIGS. 9-11 are diagrams illustrating example processes relating to uplink-centric handover in a wireless multi-hop network, in accordance with various aspects of the present disclosure.

FIG. 9 is a diagram illustrating an example process 900 performed, for example, by a child node, in accordance with various aspects of the present disclosure. Example process 900 is an example where the child node (e.g., an IAB node 410, a child node 705, a UE 120, a base station 110, and/or the like) performs operations associated with uplink-centric handover in a wireless multi-hop network.

As shown in FIG. 9, in some aspects, process 900 may include receiving a configuration for transmission of an uplink reference signal for a handover procedure (block 910). For example, the child node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may receive a configuration for transmission of an uplink reference signal for a handover procedure, as described above.

As further shown in FIG. 9, in some aspects, process 900 may include transmitting the uplink reference signal according to the configuration (block 920). For example, the child node (e.g., using transmit processor 220, controller/processor 240, memory 242, transmit processor 264, controller/processor 280, memory 282, and/or the like) may transmit the uplink reference signal according to the configuration, as described above.

As further shown in FIG. 9, in some aspects, process 900 may include receiving a handover command or monitoring for a downlink reference signal for the handover procedure based at least in part on transmitting the uplink reference signal (block 930). For example, the child node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may receive a handover command or monitor for a downlink reference signal for the handover procedure based at least in part on transmitting the uplink reference signal, as described above.

Process 900 may include additional aspects, such as any single aspect or any combination of aspects described below and/or in connection with one or more other processes described elsewhere herein.

In a first aspect, the configuration indicates at least one of a resource for transmission of the uplink reference signal, a transmit power for transmission of the uplink reference signal, a beam configuration for transmission of the uplink reference signal, or a combination thereof.

In a second aspect, alone or in combination with the first aspect, the uplink reference signal is a sounding reference signal.

In a third aspect, alone or in combination with one or more of the first and second aspects, the uplink reference signal is transmitted by a user equipment or a mobile termination component of an integrated access and backhaul node.

In a fourth aspect, alone or in combination with one or more of the first through third aspects, the configuration is received from a control node of the wireless multi-hop network via a radio resource control message.

In a fifth aspect, alone or in combination with one or more of the first through fourth aspects, the uplink reference signal is a synchronization signal block or a channel state information reference signal.

In a sixth aspect, alone or in combination with one or more of the first through fifth aspects, the uplink reference signal is transmitted by a distributed unit component of an integrated access and backhaul node.

In a seventh aspect, alone or in combination with one or more of the first through sixth aspects, the configuration is received from a control node of the wireless multi-hop network via an F1 application protocol interface.

In an eighth aspect, alone or in combination with one or more of the first through seventh aspects, the downlink reference signal is a synchronization signal block or a channel state information reference signal.

In a ninth aspect, alone or in combination with one or more of the first through eighth aspects, the uplink reference signal is transmitted in multiple directions using beam-sweeping.

In a tenth aspect, alone or in combination with one or more of the first through ninth aspects, the uplink reference signal is transmitted in a first direction and is subsequently transmitted in a second direction based at least in part on a determination that: a handover command was not received based at least in part on transmission of the uplink reference signal in the first direction, or a downlink reference signal, for the handover procedure, that satisfies a threshold was not received based at least in part on transmission of the uplink reference signal in the first direction.

In an eleventh aspect, alone or in combination with one or more of the first through tenth aspects, process 900 includes transmitting a random access channel preamble to a target node for the handover procedure based at least in part on receiving the handover command.

In a twelfth aspect, alone or in combination with one or more of the first through eleventh aspects, process 900 includes monitoring for the downlink reference signal for the handover procedure on one or more resources that correspond to a resource via which the uplink reference signal is transmitted.

In a thirteenth aspect, alone or in combination with one or more of the first through twelfth aspects, the handover command is received without transmission of a measurement report for the handover procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
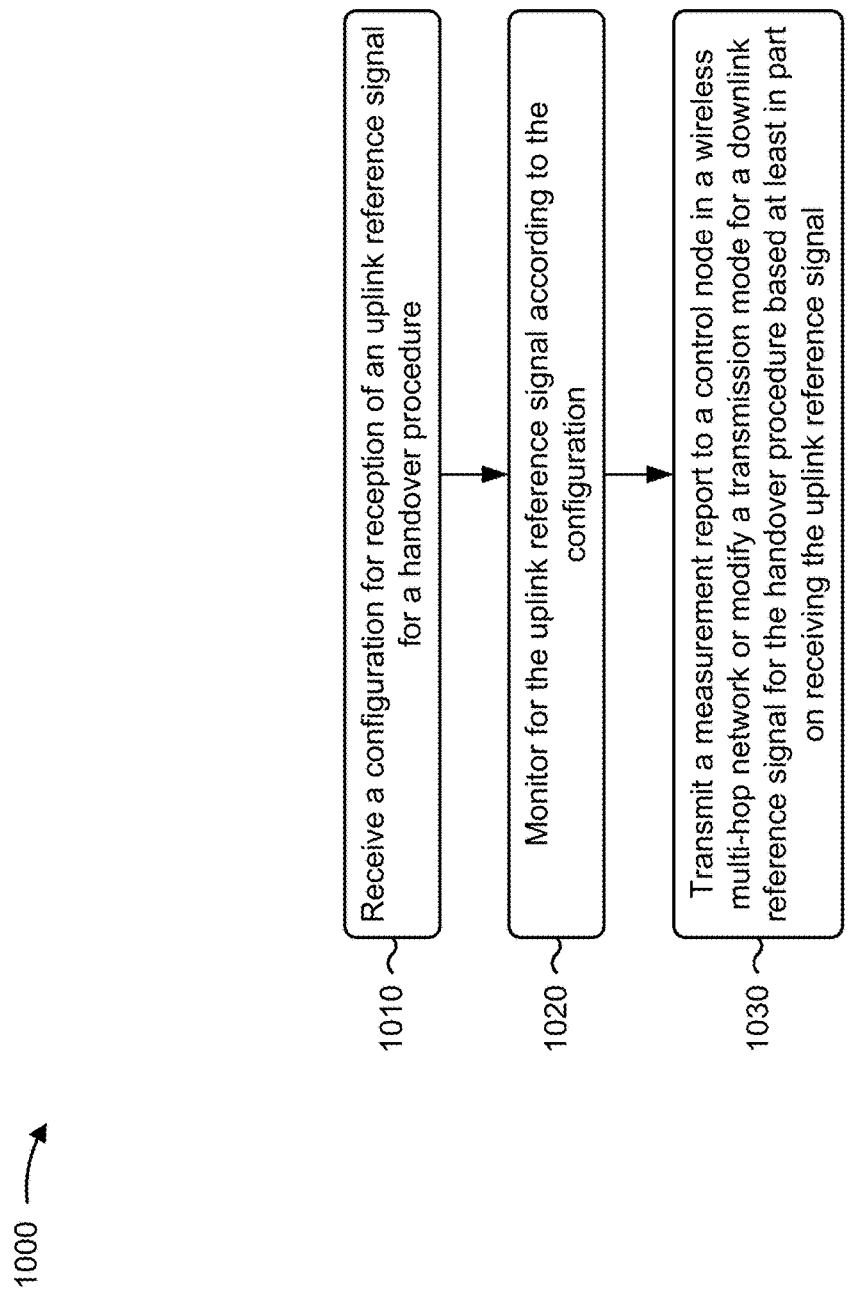

FIG. 10 is a diagram illustrating an example process 1000 performed, for example, by a neighbor node, in accordance with various aspects of the present disclosure. Example process 1000 is an example where the neighbor node (e.g., an IAB node 410, a neighbor node 715, a base station 110, and/or the like) performs operations associated with uplink-centric handover in a wireless multi-hop network.

As shown in FIG. 10, in some aspects, process 1000 may include receiving a configuration for reception of an uplink reference signal for a handover procedure (block 1010). For example, the neighbor node (e.g., using antenna 234, DEMOD 232, MIMO detector 236, receive processor 238, controller/processor 240, memory 242, and/or the like) may receive a configuration for reception of an uplink reference signal for a handover procedure, as described above.

As further shown in FIG. 10, in some aspects, process 1000 may include monitoring for the uplink reference signal according to the configuration (block 1020). For example, the neighbor node (e.g., using antenna 234, DEMOD 232, MIMO detector 236, receive processor 238, controller/processor 240, memory 242, and/or the like) may monitor for the uplink reference signal according to the configuration, as described above.

As further shown in FIG. 10, in some aspects, process 1000 may include transmitting a measurement report to a control node in the wireless multi-hop network or modifying a transmission mode for a downlink reference signal for the handover procedure based at least in part on receiving the uplink reference signal (block 1030). For example, the neighbor node (e.g., using controller/processor 240, memory 242, transmit processor 220, TX MIMO processor 230, MOD 232, antenna 234, and/or the like) may transmit a measurement report to a control node in the wireless multi-hop network or modify a transmission mode for a downlink reference signal for the handover procedure based at least in part on receiving the uplink reference signal, as described above.

Process 1000 may include additional aspects, such as any single aspect or any combination of aspects described below and/or in connection with one or more other processes described elsewhere herein.

In a first aspect, the configuration for reception of the uplink reference signal indicates at least one of a power saving mode configuration for the neighbor node, a resource for monitoring for the uplink reference signal, a beam configuration for monitoring for the uplink reference signal, or a combination thereof.

In a second aspect, alone or in combination with the first aspect, process 1000 includes transmitting the measurement report to the control node based at least in part on a measurement and reporting configuration that indicates a condition for transmitting the measurement report.

In a third aspect, alone or in combination with one or more of the first and second aspects, the measurement and reporting configuration is received via a radio resource control message.

In a fourth aspect, alone or in combination with one or more of the first through third aspects, process 1000 includes receiving a handover request from the control node based at least in part on transmitting the measurement report to the control node.

In a fifth aspect, alone or in combination with one or more of the first through fourth aspects, process 1000 includes receiving an instruction, from the control node, to modify the transmission mode based at least in part on transmitting the measurement report to the control node.

In a sixth aspect, alone or in combination with one or more of the first through fifth aspects, modifying the transmission mode for the downlink reference signal for the handover procedure comprises transmitting the downlink reference signal more frequently as compared to a time period prior to modifying the transmission mode.

In a seventh aspect, alone or in combination with one or more of the first through sixth aspects, the transmission mode is modified based at least in part on a determination that a condition, indicated by the control node and associated with the uplink reference signal, is satisfied.

In an eighth aspect, alone or in combination with one or more of the first through seventh aspects, at least one of a transmit power for the downlink reference signal or a beam for transmission of the downlink reference signal is determined based at least in part on the uplink reference signal.

In a ninth aspect, alone or in combination with one or more of the first through eighth aspects, the downlink reference signal is a synchronization signal block or a channel state information reference signal.

In a tenth aspect, alone or in combination with one or more of the first through ninth aspects, the uplink reference signal is a sounding reference signal, a synchronization signal block, or a channel state information reference signal.

In an eleventh aspect, alone or in combination with one or more of the first through tenth aspects, the configuration for reception of the uplink reference signal for the handover procedure is received via a radio resource control message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
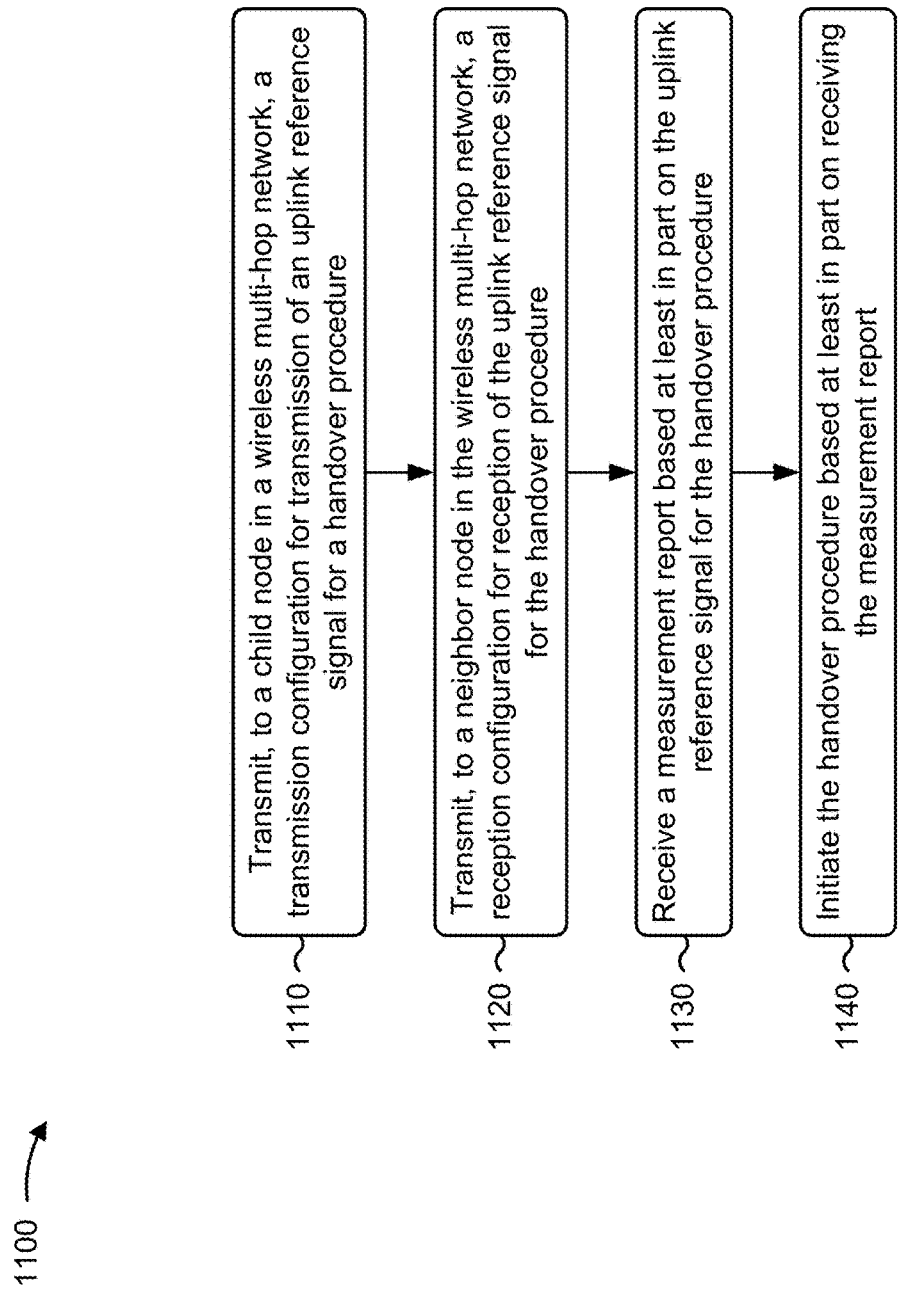

FIG. 11 is a diagram illustrating an example process 1100 performed, for example, by a control node, in accordance with various aspects of the present disclosure. Example process 1100 is an example where the control node (e.g., an IAB donor 405, an IAB node 410, a serving node 710, a control node 720, a base station 110, and/or the like) performs operations associated with uplink-centric handover in a wireless multi-hop network.

As shown in FIG. 11, in some aspects, process 1100 may include transmitting, to a child node in the wireless multi-hop network, a transmission configuration for transmission of an uplink reference signal for a handover procedure (block 1110). For example, the control node (e.g., using controller/processor 240, memory 242, transmit processor 220, TX MIMO processor 230, MOD 232, antenna 234, communication unit 294, controller/processor 290, memory 292, and/or the like) may transmit, to a child node in the wireless multi-hop network, a transmission configuration for transmission of an uplink reference signal for a handover procedure, as described above.

As further shown in FIG. 11, in some aspects, process 1100 may include transmitting, to a neighbor node in the wireless multi-hop network, a reception configuration for reception of the uplink reference signal for the handover procedure (block 1120). For example, the control node (e.g., using controller/processor 240, memory 242, transmit processor 220, TX MIMO processor 230, MOD 232, antenna 234, communication unit 294, controller/processor 290, memory 292, and/or the like) may transmit, to a neighbor node in the wireless multi-hop network, a reception configuration for reception of the uplink reference signal for the handover procedure, as described above.

As further shown in FIG. 11, in some aspects, process 1100 may include receiving a measurement report based at least in part on the uplink reference signal for the handover procedure (block 1130). For example, the control node (e.g., using antenna 234, DEMOD 232, MIMO detector 236, receive processor 238, controller/processor 240, memory 242, communication unit 294, controller/processor 290, memory 292, and/or the like) may receive a measurement report based at least in part on the uplink reference signal for the handover procedure, as described above.

As further shown in FIG. 11, in some aspects, process 1100 may include initiating the handover procedure based at least in part on receiving the measurement report (block 1140). For example, the control node (e.g., using controller/processor 240, memory 242, transmit processor 220, TX MIMO processor 230, MOD 232, antenna 234, communication unit 294, controller/processor 290, memory 292, and/or the like) may initiate the handover procedure based at least in part on receiving the measurement report, as described above.

Process 1100 may include additional aspects, such as any single aspect or any combination of aspects described below and/or in connection with one or more other processes described elsewhere herein.

In a first aspect, the transmission configuration indicates at least one of a resource for transmission of the uplink reference signal, a transmit power for transmission of the uplink reference signal, a beam configuration for transmission of the uplink reference signal, or a combination thereof.

In a second aspect, alone or in combination with the first aspect, the transmit power is determined based at least in part on a location of the neighbor node.

In a third aspect, alone or in combination with one or more of the first and second aspects, the reception configuration indicates at least one of a power saving mode configuration for the neighbor node, a resource for monitoring for the uplink reference signal, a beam configuration for monitoring for the uplink reference signal, or a combination thereof.

In a fourth aspect, alone or in combination with one or more of the first through third aspects, process 1100 includes transmitting, to the neighbor node, a measurement and reporting configuration that indicates a condition for transmitting the measurement report.

In a fifth aspect, alone or in combination with one or more of the first through fourth aspects, the measurement report is received from the neighbor node based at least in part on the measurement and reporting configuration.

In a sixth aspect, alone or in combination with one or more of the first through fifth aspects, initiating the handover procedure comprises at least one of transmitting a handover command to the child node via a parent node of the child node, transmitting a handover request to the parent node, transmitting a handover request to the neighbor node, or a combination thereof.

In a seventh aspect, alone or in combination with one or more of the first through sixth aspects, process 1100 includes transmitting, to the neighbor node, an instruction to modify a transmission mode of the neighbor node for transmission of a downlink reference signal by the neighbor node based at least in part on receiving the measurement report.

In an eighth aspect, alone or in combination with one or more of the first through seventh aspects, process 1100 includes transmitting, to the neighbor node, a condition for modifying a transmission mode of the neighbor node for transmission of a downlink reference signal by the neighbor node.

In a ninth aspect, alone or in combination with one or more of the first through eighth aspects, process 1100 includes determining at least one of the transmission configuration or the reception configuration to align a transmission time of the uplink reference signal with an active time period of the neighbor node.

In a tenth aspect, alone or in combination with one or more of the first through ninth aspects, process 1100 includes determining at least one of the transmission configuration or the reception configuration to align a transmit beam direction for the uplink reference signal with a receive beam direction used by the neighbor node to monitor for the uplink reference signal.

In an eleventh aspect, alone or in combination with one or more of the first through tenth aspects, the control node is a parent node of the child node, another node in the wireless multi-hop network, or a central unit in the wireless multi-hop network.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a child node in a wireless network, comprising:
   receiving, from a control node and based at least in part on transmitting information of the child node to the control node, a transmission configuration indicating one or more parameters for transmission of an uplink sounding reference signal (SRS) for a handover procedure from a serving node to one of a plurality of neighbor nodes,
      wherein the child node, the control node, the serving node, and the plurality of neighbor nodes are each in the wireless network and separate from each other, and
      wherein the one or more parameters is for at least one of:
         aligning a transmission time of the uplink SRS with an active time period of one or more neighbor nodes of the plurality of neighbor nodes, or
         aligning a transmit beam direction of the uplink SRS with a receive beam direction of the one or more neighbor nodes;
   transmitting the uplink SRS to each of the plurality of neighbor nodes according to the transmission configuration; and
   receiving a handover command, indicating a neighbor node of the plurality of neighbor nodes to which the child node is to be handed over, based at least in part on transmitting the uplink SRS.

2. The method of claim 1, wherein the one or more parameters is for at least one of a resource for transmission of the uplink SRS, a transmit power for transmission of the uplink SRS, or a combination thereof.

3. The method of claim 1, wherein the child node includes a mobile termination component of an integrated access and backhaul node.

4. The method of claim 3, wherein the transmission configuration is received from the control node of the wireless network via a radio resource control message.

5. The method of claim 1, wherein the uplink SRS comprises asynchronization signal block or a channel state information.

6. The method of claim 5, wherein the uplink SRS is transmitted by a distributed unit component of an integrated access and backhaul node of the child node.

7. The method of claim 5, wherein the transmission configuration is received from the control node of the wireless network via an F1 application protocol interface.

8. The method of claim 1, further comprising:
monitoring for a downlink reference signal for the handover procedure,
wherein the downlink reference signal is a synchronization signal block or a channel state information reference signal.

9. The method of claim 1, wherein the uplink SRS is transmitted in multiple directions using beam-sweeping.

10. The method of claim 1, wherein the uplink SRS is transmitted in a first direction and is subsequently transmitted in a second direction based at least in part on:
the handover command not being received based at least in part on the transmission of the uplink SRS in the first direction, or
a downlink reference signal, for the handover procedure, that satisfies a threshold was not received based at least in part on the transmission of the uplink SRS in the first direction.

11. The method of claim 1, further comprising transmitting a random access channel preamble to a target node for the handover procedure based at least in part on receiving the handover command.

12. The method of claim 1, further comprising:
monitoring for a downlink reference signal for the handover procedure on one or more resources that correspond to a resource via which the uplink SRS is transmitted.

13. The method of claim 1, wherein the handover command is received without transmission of a measurement report, by the child node, for the handover procedure.

14. A method of wireless communication performed by a neighbor node in a wireless network, comprising:
receiving, from a control node and based at least in part on transmitting information of the neighbor node to the control node, a reception configuration indicating one or more parameters for reception of an uplink sounding reference signal (SRS), from a child node, for a handover procedure associated with handing over the child node from a serving node to the neighbor node,
wherein the control node, the child node, the serving node, and the neighbor node are each in the wireless network and separate from each other, and
wherein the one or more parameters is for at least one of:
aligning an active time period of the neighbor node with a transmission time of the uplink SRS, or
aligning a receive beam direction of the neighbor node with a transmit beam direction of the uplink SRS;
monitoring for the uplink SRS according to the reception configuration; and
based at least in part on receiving the uplink SRS:
transmitting a measurement report to the control node, or
modifying a transmission mode, associated with whether the neighbor node is in a power saving mode, for a downlink reference signal for the handover procedure.

15. The method of claim 14, wherein the one or more parameters is for at least one of a power saving mode configuration for the neighbor node, a resource for monitoring for the uplink SRS, or a combination thereof.

16. The method of claim 14, wherein transmitting the measurement report to the control node or modifying the transmission mode comprises transmitting the measurement report to the control node based at least in part on a measurement and reporting configuration that indicates a condition for transmitting the measurement report.

17. The method of claim 14, wherein transmitting the measurement report to the control node or modifying the transmission mode comprises transmitting the measurement report to the control node; and further comprising:
receiving a handover request from the control node based at least in part on transmitting the measurement report to the control node.

18. The method of claim 14, wherein transmitting the measurement report to the control node or modifying the transmission mode comprises transmitting the measurement report to the control node; and further comprising:
receiving an instruction, from the control node, to modify the transmission mode based at least in part on transmitting the measurement report to the control node.

19. The method of claim 14, wherein transmitting the measurement report to the control node or modifying the transmission mode comprises modifying the transmission mode, and wherein modifying the transmission mode for the downlink reference signal for the handover procedure comprises transmitting the downlink reference signal more frequently as compared to a time period prior to modifying the transmission mode.

20. The method of claim 14, wherein transmitting the measurement report to the control node or modifying the transmission mode comprises modifying the transmission mode, and wherein the transmission mode is modified based at least in part on a condition, indicated by the control node and associated with the uplink SRS, is satisfied.

21. The method of claim 14, wherein at least one of a transmit power for the downlink reference signal or a beam for transmission of the downlink reference signal is determined based at least in part on the uplink SRS.

22. A method of wireless communication performed by a control node in a wireless network, comprising:
transmitting, to a child node, a transmission configuration indicating one or more first parameters for transmission of an uplink sounding reference signal (SRS), by the child node, for a handover procedure from a serving node to a neighbor node of a plurality of neighbor nodes,
wherein the child node, the control node, the serving node, and the neighbor node are each in the wireless network and separate from each other;
transmitting, to at least one neighbor node of the plurality of neighbor nodes, a reception configuration indicating one or more second parameters for reception of the uplink SRS for the handover procedure,
wherein at least one of: transmitting the transmission configuration is based at least in part on receiving information of the child node from the child node, wherein the one or more first parameters is for at least one of: aligning a transmission time of the uplink SRS with an active time period of the at least one neighbor node, or aligning a transmit beam direction of the uplink SRS with a receive beam direction of the at least one neighbor node; or transmitting the reception configuration is based at least in part on receiving information of the at least one neighbor node, wherein the one or more second parameters is for at least one of: aligning the active time period of the at least one neighbor node with the transmission time of the uplink SRS, or aligning the receive beam direction of the at least one neighbor nodes with the transmit beam direction of the uplink SRS;

receiving a measurement report, from each of at least a subset of neighbor nodes of the plurality of neighbor nodes, based at least in part on transmitting the reception configuration;

selecting a neighbor node of the plurality of neighbor nodes based at least in part on the measurement report; and initiating the handover procedure with the selected neighbor node.

23. The method of claim 22, further comprising transmitting, to the neighbor node, a measurement and reporting configuration that indicates a condition for transmitting the measurement report.

24. The method of claim 22, wherein initiating the handover procedure comprises at least one of transmitting a handover command to the child node via a parent node of the child node, transmitting a handover request to the parent node, transmitting a handover request to the neighbor node, or a combination thereof.

25. The method of claim 22, further comprising transmitting, to the neighbor node, an instruction to modify a transmission mode of the neighbor node for transmission of a downlink reference signal by the neighbor node based at least in part on receiving the measurement report.

26. The method of claim 22, further comprising transmitting, to the neighbor node, a condition for modifying a transmission mode of the neighbor node for transmission of a downlink reference signal by the neighbor node.

27. The method of claim 22, further comprising determining the transmission configuration.

28. The method of claim 22, further comprising determining the reception configuration.

29. A child node in a wireless network for wireless communication, comprising:

a memory; and one or more processors coupled to the memory, the one or more processors configured to:

receive, from a control node and based at least in part on transmission information of the child node to the control node, a transmission configuration indicating one or more parameters for transmission of an uplink sounding reference signal (SRS) for a handover procedure from a serving node to one of a plurality of neighbor nodes, wherein the child node, the control node, the serving node, and the plurality of neighbor nodes are each in the wireless network and separate from each other, and wherein the one or more parameters is for at least one of:

aligning a transmission time of the uplink SRS with an active time period of one or more neighbor nodes of the plurality of neighbor nodes, or aligning a transmit beam direction of the uplink SRS with a receive beam direction of the one or more neighbor nodes;

transmit the uplink SRS to each of the plurality of neighbor nodes according to the transmission configuration; and receive a handover command, indicating a neighbor node of the plurality of neighbor nodes to which the child node is to be handed over, based at least in part on transmitting the uplink SRS.

30. The child node of claim 29, wherein the one or more processors are further configured to:

monitor for a downlink reference signal for the handover procedure, wherein the downlink reference signal is a synchronization signal block or a channel state information reference signal.

* * * * *